United States Patent
Pahlke et al.

(10) Patent No.: US 12,416,707 B1
(45) Date of Patent: Sep. 16, 2025

(54) RADAR SIDELOBE BLANKING

(71) Applicant: FIRST RF Corporation, Boulder, CO (US)

(72) Inventors: Eric Pahlke, Superior, CO (US); Luke Sankey, Berthoud, CO (US); Kristina Brunsgaard, Perth (AU)

(73) Assignee: FIRST RF Corporation, Boulder, CO (US)

( * ) Notice: Subject to any disclaimer, the term of this patent is extended or adjusted under 35 U.S.C. 154(b) by 330 days.

(21) Appl. No.: 17/992,770

(22) Filed: Nov. 22, 2022

(51) Int. Cl.
*G01S 7/28* (2006.01)

(52) U.S. Cl.
CPC .................................. *G01S 7/2813* (2013.01)

(58) Field of Classification Search
CPC .. G01S 7/2813; G01S 7/36; G01S 2013/0254; G01S 7/023; H01Q 3/2611; H01Q 1/521
See application file for complete search history.

(56) References Cited

U.S. PATENT DOCUMENTS

| | | |
|---|---|---|
| 4,021,805 A | 5/1977 | Effinger et al. |
| 5,874,917 A | 2/1999 | Desodt et al. |
| 6,538,597 B1 * | 3/2003 | Steudel ................. H04K 3/224 342/149 |
| 8,248,298 B2 | 8/2012 | Lalezari |
| 10,998,945 B1 * | 5/2021 | Baligh ..................... B07C 3/00 |
| 2014/0132449 A1 * | 5/2014 | Roper ................. H01Q 3/2635 342/368 |
| 2021/0296764 A1 * | 9/2021 | Shams ................. H01Q 3/385 |

FOREIGN PATENT DOCUMENTS

WO    WO-2021142041 A1 *   7/2021

* cited by examiner

*Primary Examiner* — Olumide Ajibade Akonai
(74) *Attorney, Agent, or Firm* — COZEN O'CONNOR

(57) ABSTRACT

A sidelobe blanking method is used with a radar system with a linear transmit array along a first axis and a linear receive array along a second axis perpendicular to the first axis. The method transmits a transmit guard signal using a transmit guard antenna with a wide beamwidth in both axes, determines a first guard signal strength of a signal captured by the receive array at a first receive angle, transmits a radar signal using the transmit array at a transmit angle, determines a second guard signal strength of a signal captured by a receive guard antenna with a wide beamwidth in both axes, receives a radar return signal using the receive array at the receive angle, and blanks the radar return signal when its signal strength is less than either the first guard signal strength or the second guard signal strength.

19 Claims, 10 Drawing Sheets

RADAR SIDELOBE BLANKING

BACKGROUND

Sidelobe blanking is a technique commonly used with some radar systems to discriminate between true return signals and erroneous return signals arising from sidelobe clutter. To implement sidelobe blanking, a guard antenna operates near a primary antenna (e.g., an antenna array or reflector antenna) of a radar system. The guard antenna has a main lobe that is angularly wide enough to cover the main lobe and principal sidelobes of the nearby primary antenna. The guard antenna has a gain that is greater than that of the primary antenna's sidelobes but less than that of the primary antenna's main lobe. When a primary signal outputted by the primary antenna is greater than a guard signal outputted by the guard antenna, it is assumed that the primary signal is a true return signal. However, when the guard signal is greater than the primary signal, it is assumed that the primary signal was produced by sidelobe clutter and is therefore not a true return signal. In this case, the output from the primary antenna may be blanked (e.g., deleted or ignored).

SUMMARY

In certain embodiments, a sidelobe blanking method is used with a radar system. The radar system has: a plurality of transmit antenna elements forming a transmit array that extends linearly along a first axis; a plurality of receive antenna elements forming a receive array that extends linearly along a second axis perpendicular to the first axis; the transmit array having a first radiation pattern with a main transmit lobe narrow along the first axis and wide along the second axis; and the receive array having a second radiation pattern with a main receive lobe wide in the first axis and narrow in the second axis. The sidelobe blanking method includes transmitting a guard signal from a transmit guard antenna having a wide beamwidth in both the first and second axes; and controlling the receive array to sweep the main receive lobe through a plurality of receive angles defined relative to the second axis. For each receive angle of the plurality of receive angles, the sidelobe blanking method includes: receiving a first received signal using the receive array; and determining a first guard signal strength of the first received signal for said each receive angle; and rastering the radar system by (i) controlling the transmit array to sweep the main transmit lobe through a plurality of transmit angles defined relative to the first axis and (ii) controlling the receive array to sweep the main receive lobe through the plurality of receive angles. For each transmit angle of the plurality of transmit angles and each receive angle of the plurality of receive angles, the sidelobe blanking method includes: transmitting, with the transmit array, a radar signal; receiving, after said transmitting the radar signal, a second received signal with a receive guard antenna having a wide beamwidth in both the first and second axes; determining a second guard signal strength of the second received signal; receiving, after said transmitting the radar signal, a third received signal with the receive array; determining a main beam signal strength of the third received signal; and blanking the radar signal when the main beam signal strength is less than either the first guard signal strength for said each receive angle or the second guard signal strength.

In certain embodiments, a sidelobe blanking method is used with a radar system. The radar system has: a plurality of transmit antenna elements forming a transmit array that extends linearly along a first axis; a plurality of receive antenna elements forming a receive array that extends linearly along a second axis perpendicular to the first axis. The transmit array has a radiation pattern with a main transmit lobe narrow along the first axis and wide along the second axis; and the receive array has a radiation pattern with a main receive lobe wide in the first axis and narrow in the second axis. The sidelobe blanking method includes: transmitting, with a transmit guard antenna having a wide beamwidth in both axes, a transmit guard signal; receiving a first return guard signal using the receive array with the main receive lobe at one receive angle of a plurality of receive angles defined relative to the second axis; determining a first guard signal strength of the first return guard signal; transmitting a radar signal using the transmit array with the main transmit lobe at one of a plurality of transmit angles defined relative to the first axis; receiving, after said transmitting the radar signal, a second return guard signal with a receive guard antenna having a wide beamwidth in both axes; determining a second guard signal strength of the second return guard signal; receiving, after said transmitting the radar signal, a radar return signal using the receive array with the main receive lobe at the one receive angle; determining a main beam signal strength of the radar return signal; and blanking the radar return signal when the main beam signal strength is less than either the first guard signal strength or the second guard signal strength.

In certain embodiments, a sidelobe blanking method is used with a radar system. The radar system has a plurality of transmit antenna elements forming a transmit array that extends linearly along a first axis and a plurality of receive antenna elements forming a receive array that extends linearly along a second axis perpendicular to the first axis. The transmit array has a radiation pattern with a main transmit lobe narrow along the first axis and wide along the second axis, and the receive array has a radiation pattern with a main receive lobe wide along the first axis and narrow along the second axis. The sidelobe blanking method includes transmitting, with a transmit guard antenna having a wide beamwidth in both axes, a transmit guard signal having first transmit signal characteristics; transmitting a radar signal having second transmit signal characteristics, different from the first transmit signal characteristics, using the transmit array with the main transmit lobe at one of a plurality of transmit angles defined relative to the first axis; receiving a first received signal with the receive array having the main receive lobe at one receive angle of a plurality of receive angles defined relative to the second axis; determining a first guard signal strength of a portion of the first received signal having the first transmit signal characteristics; receiving a second received signal with a receive guard antenna having a wide beamwidth in both axes; determining a second guard signal strength of a portion of the second received signal having the second transmit signal characteristics; extracting, from the first received signal, a radar return signal having the second transmit signal characteristics; and blanking the radar return signal when a signal strength of the radar return signal is either (a) less than the first guard signal strength, or (b) less than the second guard signal strength.

BRIEF DESCRIPTION OF THE FIGURES

FIG. 9B is one example range map plot resulting from processing of radar return signal with sidelobe blanking.

DETAILED DESCRIPTION

U.S. Pat. No. 8,248,298, incorporated herein by reference for all purposes, discloses an orthogonal linear transmit receive array (OLTRA) radar having two orthogonal linear array antennas that are controlled to scan (e.g., using phase shift) a "pencil" beam over a target area, where the pencil beam is a pattern multiplication of beams of the two orthogonal linear array antennas. A detrimental side effect of the OLTRA radar is erroneous radar return signals caused by sidelobe clutter. Pattern multiplication, previously referred to as cross-product in U.S. Pat. No. 8,248,298, refers to an element-wise multiplication of two antenna beam patterns as used herein.

Figure 1:
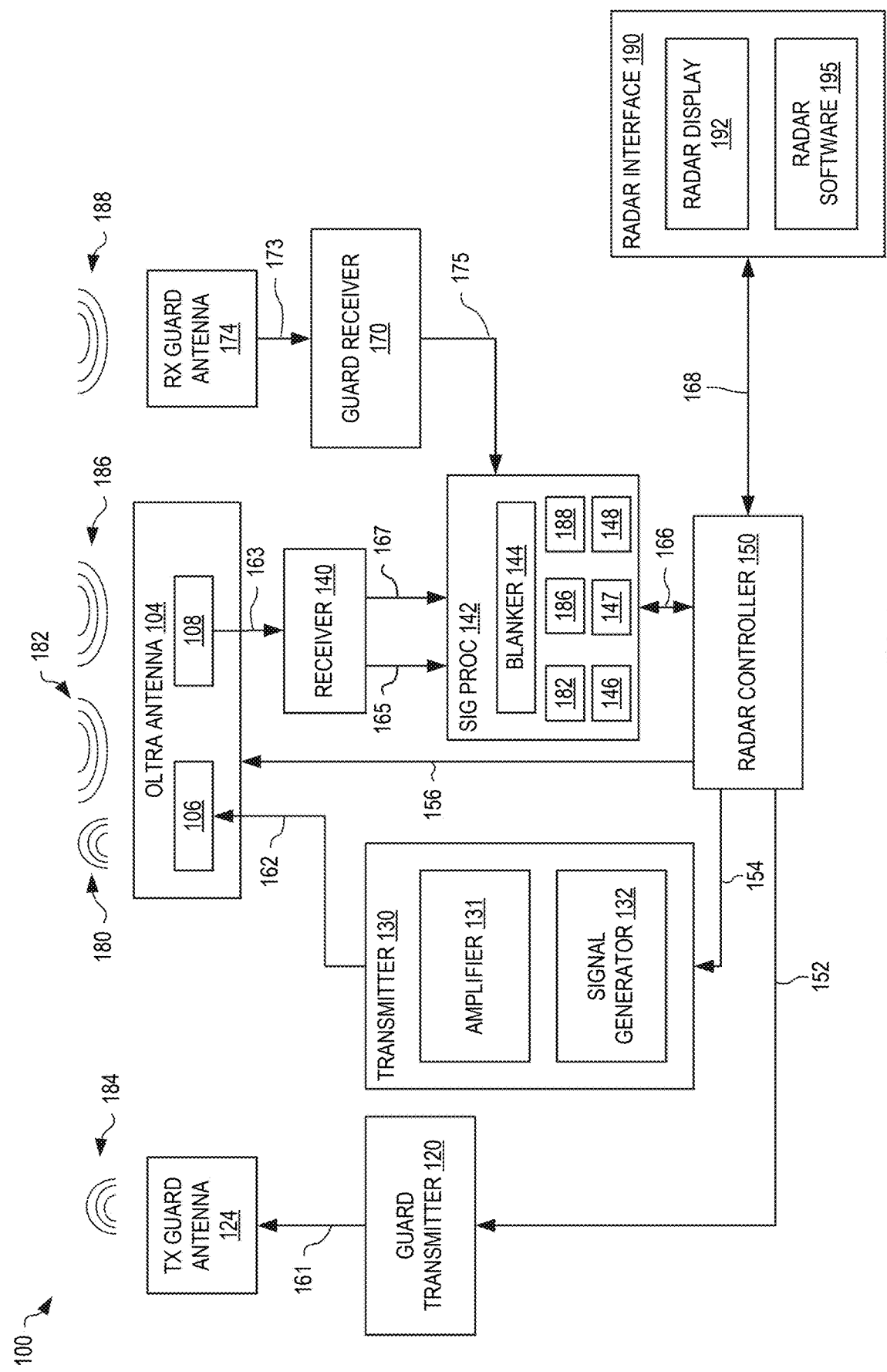
FIG. 1 is a schematic diagram illustrating one example frequency modulated continuous wave (FMCW) orthogonal linear transmit receive array (OLTRA) radar system with sidelobe blanking, in embodiments.

FIG. 1 is a schematic diagram illustrating one example of an OLTRA radar system 100 with sidelobe blanking. OLTRA radar system 100 is, for example, a fully integrated radar that includes an OLTRA antenna 104, a transmitter 130, a receiver 140, a signal processor (SIG PROC) 142, and a radar controller 150. OLTRA antenna 104 includes a first one-dimensional (1D) linear array 106 (also known as a transmit array) and a second 1D linear array 108 (also known as a receive array) that is orthogonal to first 1D linear array 106, where both first 1D linear array 106 and second 1D linear array 108 are independently steerable. OLTRA radar system 100 may operate with a variety of radar waveforms including frequency modulated continuous wave (FMCW), CW and pulse Doppler. Transmitter 130 includes a signal generator 132 that generates a transmit signal that is amplified by an amplifier 131 and fed into first 1D linear array 106. In the embodiment of FIG. 1, OLTRA radar system 100 does not require a duplexer because the transmit and receive functions are handled by different apertures (first 1D linear array 106 and second 1D linear array 108) of OLTRA antenna 104 and switching between transmit/receive modes (as required by a single aperture antenna) is not required. Accordingly, transmitter 130 connects directly to first 1D linear array 106 via a transmit transmission line 162 and receiver 140 connects directly to second 1D linear array 108 via a receive transmission line 163. Radar controller 150 controls amplifier 131 of transmitter 130 via control line 154 to drive OLTRA antenna 104 and controls OLTRA antenna 104 via control line 156 to output and steer a radar signal 180. Radar controller 150 also steers second 1D linear array 108 via control line 156 to capture a radar return signal 182, which may include reflections of the radar signal 180 from an object or target within an operational area of OLTRA radar system 100, that is fed to receiver 140 via receive transmission line 163. An output from receiver 140 is fed into signal processor 142 via a transmission line 165. Signal processor 142 communicates with radar controller 150 via communication channel 166. An output from radar controller 150 is sent, via a transmission line 168, to a radar interface 190 and processed by radar software 195 to generate an output on a radar display 192.

OLTRA radar system 100 also includes a transmit guard antenna 124 that has a wide beamwidth in both axes, is distinct from first 1D linear array 106, and is driven by a guard transmitter 120 via a transmission line 161 to output a transmit guard signal 184. Alternatively, transmit guard antenna 124 can be driven by transmitter 130 (e.g., via a switch that connects the output of transmitter 130 to either first 1D linear array 106 or transmit guard antenna 124). In certain embodiments, transmit guard antenna 124 is implemented by one element of first 1D linear array 106. In certain other embodiments, transmit guard antenna 124 is implemented by multiple elements of first 1D linear array 106 that are used to generate transmit guard signal 184 as a spoiled beam. Operation of guard transmitter 120 is controlled by a transmit guard control signal 152 received from radar controller 150. Based on transmit guard control signal 152, guard transmitter 120 transmits, via transmit guard antenna 124, transmit guard signal 184. A first return guard signal 186, which may include reflections of transmit guard signal 184 from any object or target within the operational area of OLTRA radar system 100, is received by second 1D linear array 108 and sent to receiver 140 via receive transmission line 163.

OLTRA radar system 100 also includes a receive guard antenna 174 that has a wide beamwidth in both axes for receiving a second return guard signal 188 and that is coupled, via a transmission line 173, to a guard receiver 170 that feeds return guard signal 188 to signal processor 142 via a transmission line 175. In certain embodiments, receive guard antenna 174 is implemented by one element of second 1D linear array 108.

Figure 10:
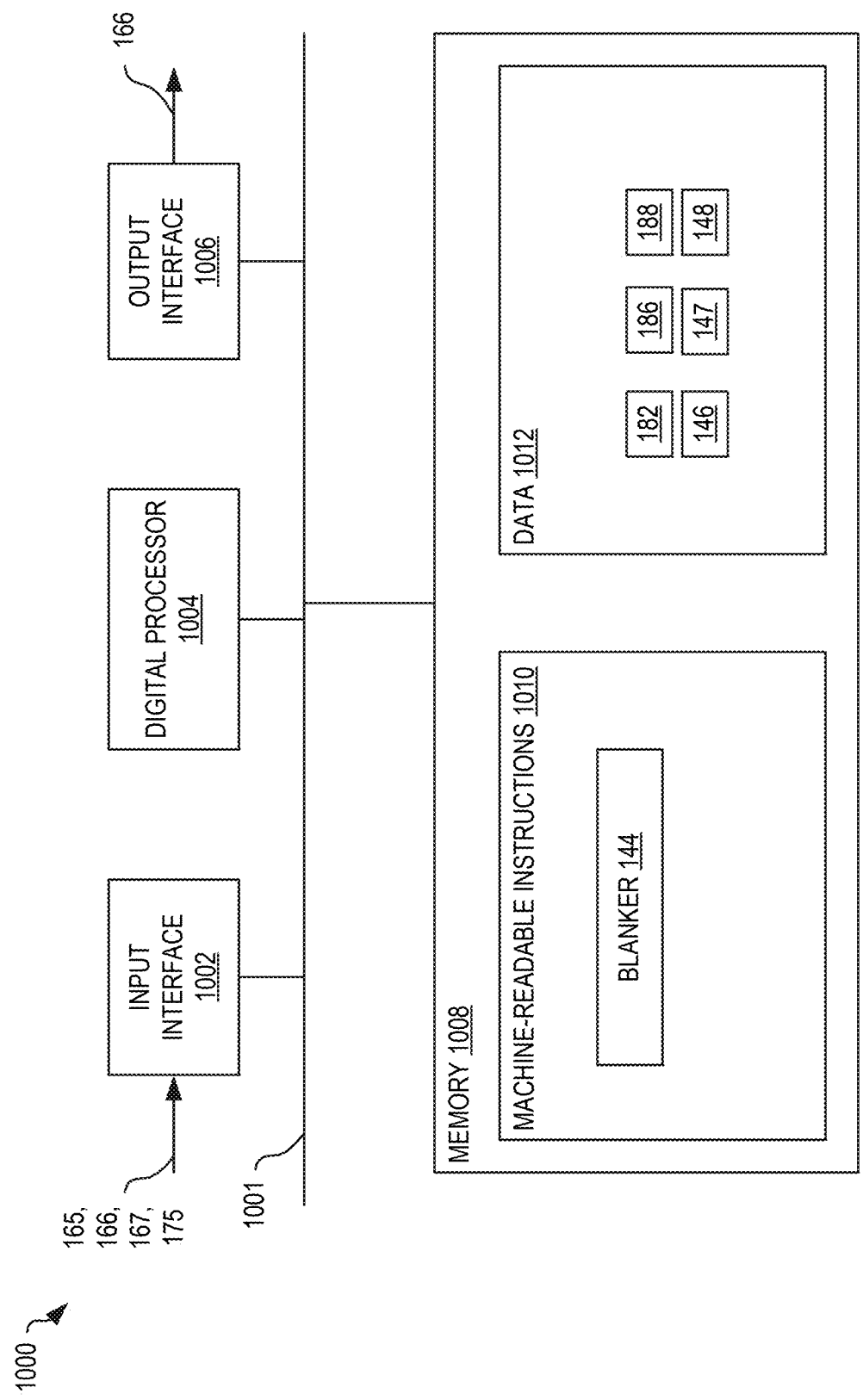
FIG. 10 is a schematic diagram illustrating an example computing apparatus that implements the signal processor of FIG. 1, in certain embodiments.

Signal processor 142 includes a sidelobe blanker 144 that blanks radar return signal 182 when any one or both of first return guard signal 186 and second return guard signal 188 indicates that radar return signal 182 is from a sidelobe and not the main beam, as described in further detail below. In certain embodiments, signal processor 142 is a hard-wired circuit that implements functionality of signal processor 142 described herein. For example, signal processor 142 may be implemented at least in part by an FPGA that is preprogrammed to perform tasks and therefore acts like a hard-wired circuit. Accordingly, in these embodiments the functionality is implemented only in hardware and no machine-readable instructions are included. FIG. 10, described below, shows an alternative embodiment in which signal processor 142 includes machine-readable instructions. In these embodiments, sidelobe blanker 144 uses two guard signals to determine when the radar return signal would result in clutter on radar display 192. This overcomes the limitations of the prior art and provides a complete sidelobe blanking solution for OLTRA radar system 100. While FIG. 1 shows signal processor 142 as separate from radar controller 150, it should be understood that signal processor may be integrated with radar controller 150.

Radar controller 150 coordinates operation of OLTRA radar system 100, controlling sweeping of OLTRA antenna 104 (both first 1D linear array 106 and second 1D linear array 108), operation of guard transmitter 120, synchronization of signal processor 142 to reduce clutter, and output of radar data to radar software 195 for output on radar display 192. Blanker 144 may also include a thresholding algorithm that determines threshold signal level values of radar return signal 182, first return guard signal 186, and second return guard signal 188 for use when determining whether a return in radar return signal 182 indicates a "real" target or whether it results from the sidelobes.

Figure 2:
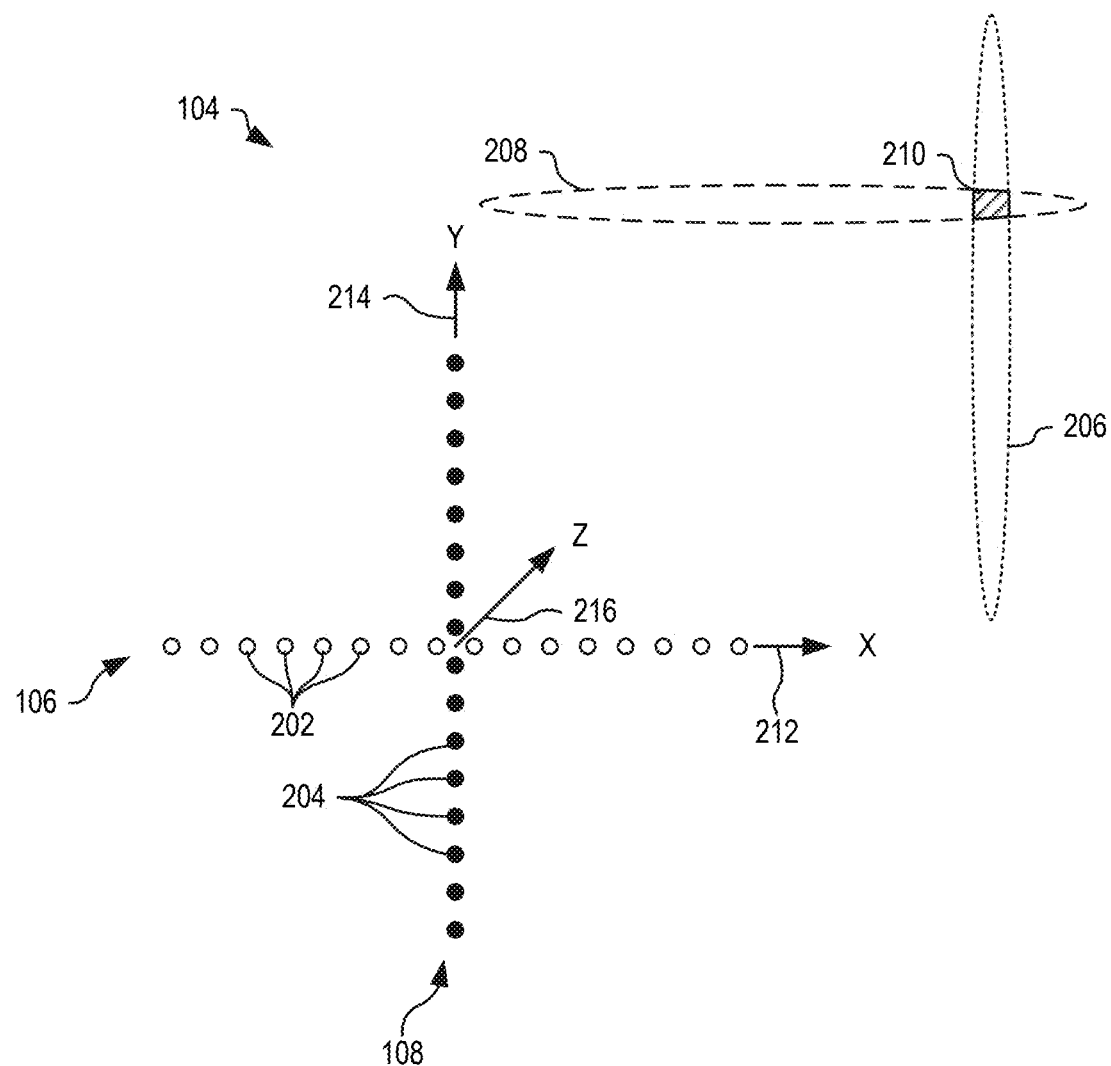
FIG. 2 shows the OLTRA antenna of FIG. 1 in further example detail illustrating a first 1D linear array that is orthogonal to a second 1D linear array, in embodiments.

FIG. 2 shows OLTRA antenna 104 of FIG. 1 in further example detail illustrating first 1D linear array 106 orthogonal to second 1D linear array 108. In the example of FIG. 1, first 1D linear array 106 is a transmit array formed by sixteen apertures (elements) 202 and second 1D linear array 108 is a receive array formed by sixteen apertures (element) 204. First 1D linear array 106 transmits radar signal 180, illustrated as a transmit main lobe 206, and second 1D linear array 108 receive radar return signal 182, illustrated as a receive main lobe 208. Transmit main lobe 206 and receive main lobe 208 represent idealistic main beam characteristics of first 1D linear array 106 and second 1D linear array 108, respectively. A pattern multiplication of first 1D linear array 106 (transmit main lobe 206) and second 1D linear array 108 (receive main lobe 208) is a high-resolution spot beam 210. In the example of FIGS. 1 and 2, first linear 1D array 106 has a horizontal orientation (as indicated by horizontal axis 212) and second 1D linear array 108 has a vertical orientation (as indicated by vertical axis 214); however, the antenna positions may be switched without change in functionality of OLTRA antenna 104.

First 1D linear array 106 is electrically driven to produce transmit main lobe 206 that is a "fan" beam propagating in a direction indicated by Z axis 216, wide in the vertical (Y) axis 214 and narrow in the horizontal (X) axis 212, and second 1D linear array 108 forms receive main lobe 208 (also a "fan" beam) that is wide in the horizontal axis 212 and narrow in the vertical axis 214. First 1D linear array 106 is controlled to steer transmit main lobe 206 (e.g., radar signal 180) to any of a plurality of azimuth angles relative to horizontal axis 212 and second 1D linear array 108 is controlled to steer receiving of receive main lobe 208 (e.g., radar return signal 182) to any of a plurality of elevation angles relative to vertical axis 214. For example, radar controller 150 uses phase shifting (e.g., a variable signal delay for each element 202 of first 1D linear array 106) to steer transmit main lobe 206 through a plurality of azimuth transmit angles defined relative to horizontal axis 212 and uses phase shifting (e.g., a variable signal delay for each element 204 of second 1D linear array 108) to steer receive main lobe 208 through a plurality of elevation receive angles defined relative to vertical axis 214. Radar controller 150 may independently steer transmit main lobe 206 and receive main lobe 208 through any number of angles and is not limited by the number of apertures (elements) 202/204; however, the following examples illustrate the use of sixteen angular positions for each of transmit main lobe 206 and receive main lobe 208. In one example of operation, radar controller 150 controls phase of each element 202 of first 1D linear array 106 to steer transmit main lobe 206 to any of sixteen different equally spaced elevation angles between a minimum elevation angle (e.g., −45°) and a maximum elevation angle (e.g., 45°) and controls phase of each element 204 of second 1D linear array 108 to steer receive main lobe 208 to any of sixteen different equally spaced azimuth angles between a minimum azimuth angle (e.g., −45°) and a maximum azimuth angle (e.g., 45°). Accordingly, through the pattern multiplication of transmit main lobe 206 and receive main lobe 208, OLTRA radar system 100 achieves an effective pencil beam (e.g., spot beam 210) that is directable within a two-dimensional (2D) array of angles (e.g., a 16×16 angular array having two-hundred and fifty-six angular combinations). However, OLTRA antenna 104 may have more or fewer elements 202, 204, and may use more or fewer elevation and/or azimuth angles without departing from the scope hereof. Further, although the number of transmit or receive angles is the same as the number of elements 202/204 in each of first 1D linear array 106 and second 1D linear array 108, the number of transmit or receive angles may be different without departing from the scope hereof.

Figure 3A:
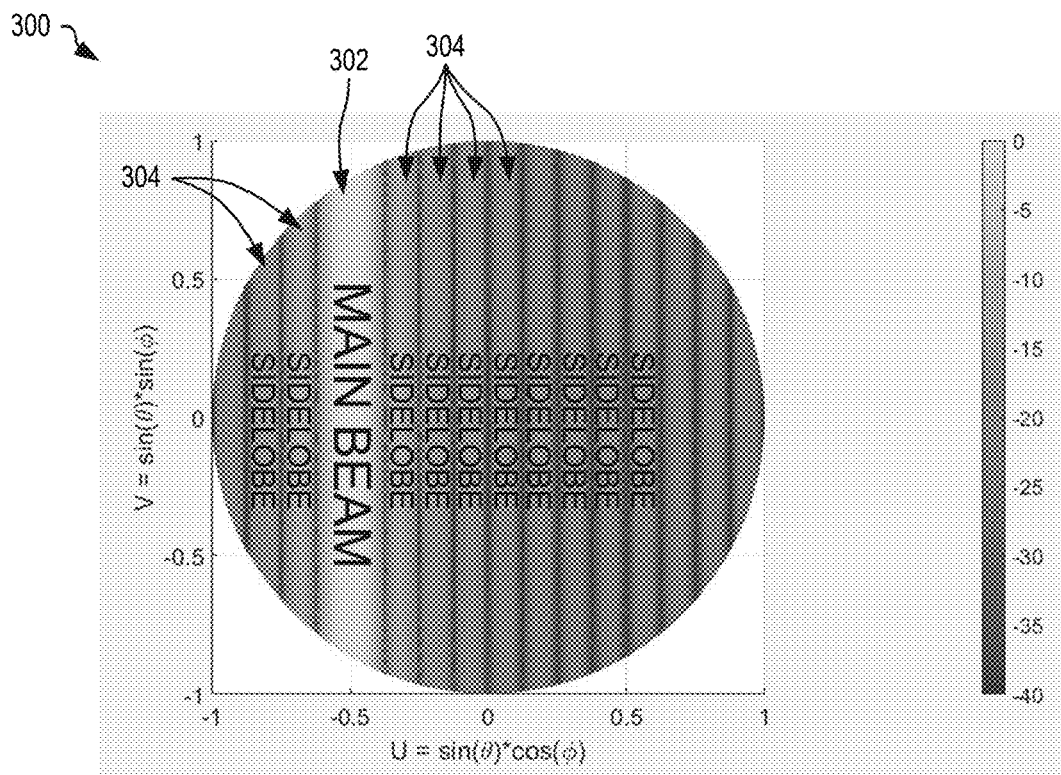
FIG. 3A shows an example 2D plot of the radar signal of FIG. 1, transmitted by the first 1D linear array, illustrating a main transmit lobe and a plurality of transmit sidelobes, in embodiments.
Figure 3B:
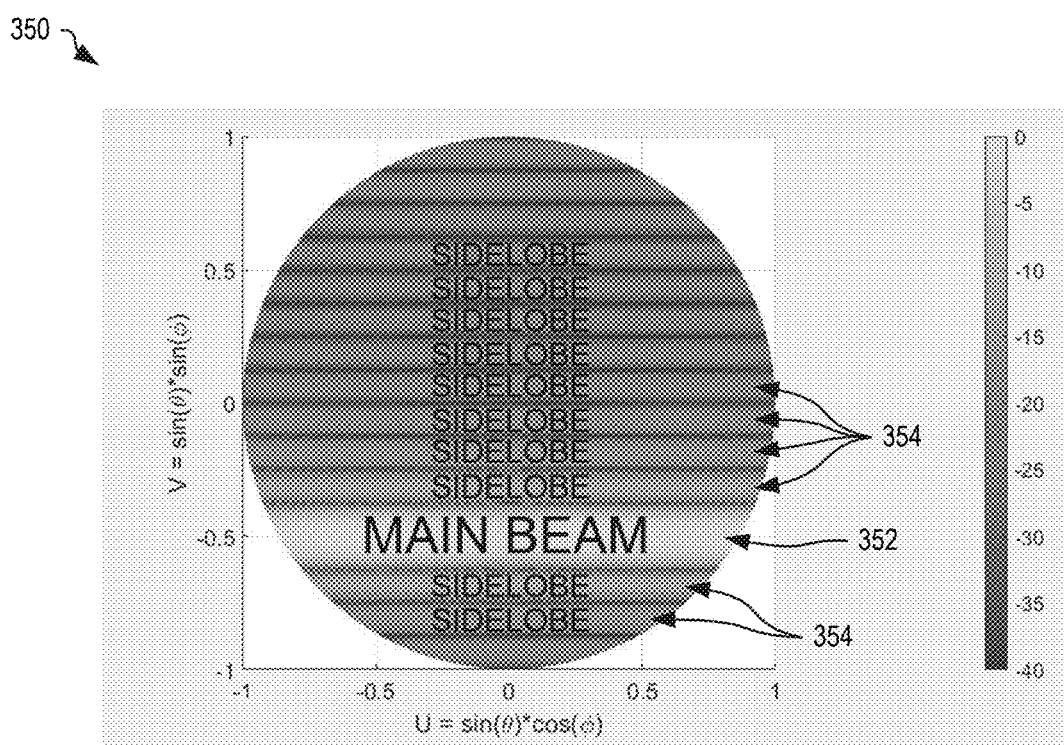
FIG. 3B shows an example 2D plot of receive beam characteristics of the second 1D linear array of FIG. 1, illustrating a main receive lobe and a plurality of receive sidelobes, in embodiments.

FIG. 3A shows an example 2D plot 300 of radar signal 180 of FIG. 1 illustrating a main transmit lobe 302 (e.g., transmit main lobe 206 of FIG. 2) and a plurality of transmit sidelobes 304 (not all labelled for clarity of illustration) that generally diminish in intensity with increasing angle from main transmit lobe 302. FIG. 3B shows an example 2D plot 350 of receive beam characteristics (e.g., receive main lobe 208 of FIG. 2) of second 1D linear array 108, illustrating a main receive lobe 352 and a plurality of receive sidelobes 354 (not all labelled for clarity of illustration) that generally diminish in intensity with increasing angle from main receive lobe 352. As appreciated, since first 1D linear array 106 is similar to second 1D linear array 108, other than orientation, characteristics of main receive lobe 352 and a receive sidelobes 354 are similar to characteristics of main transmit lobe 302 and transmit sidelobes 304, respectively.

Figure 4:
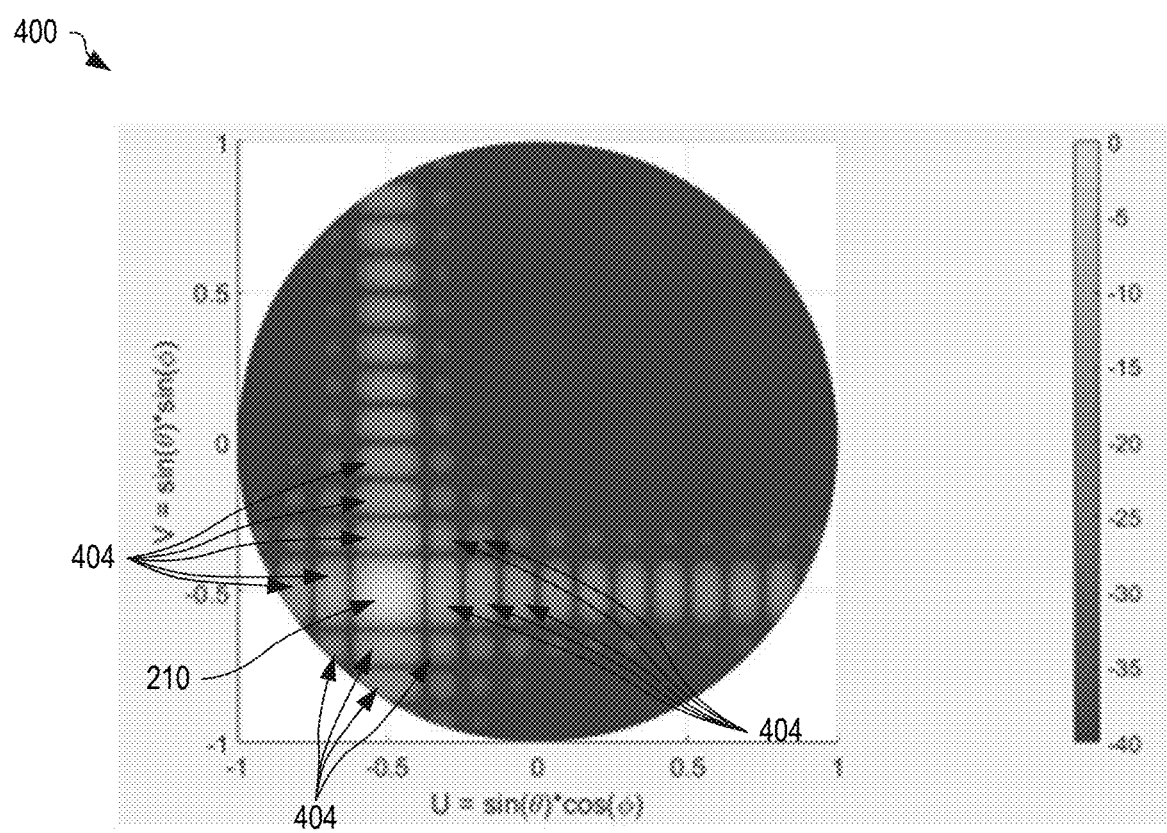
FIG. 4 is a 2D plot illustrating a resultant pattern multiplication of the main transmit lobe and the transmit sidelobes of FIG. 3A with the main receive lobe and the receive sidelobes of FIG. 3B, illustrating the spot beam of FIG. 2 and sidelobe products.

FIG. 4 is a 2D plot 400 illustrating a resultant pattern multiplication of main transmit lobe 302 and transmit sidelobes 304 of FIG. 3A with main receive lobe 352 and receive sidelobes 354 of FIG. 3B, illustrating spot beam 210 of FIG. 2 and resultant sidelobe products 404 (not all labelled for clarity of illustration). Sidelobe products 404 may cause clutter on radar display 192 unless blanked.

Sidelobe Blanking for OLTRA

In a conventional radar system (e.g., one that does not use OLTRA antenna 104), a single omni-directional element, called the guard channel, is deployed with the main radar antenna. A signal level of a signal received by the guard channel is compared with a signal level of a return signal received by the main radar antenna to determine when the return signal includes echoes from sidelobes and should be "blanked."

One aspect of the present embodiments includes the realization that, since radar signal 180 (e.g., transmit main lobe 206) is a fan beam, transmit sidelobes exist in only one dimension (e.g., repeated in the horizontal direction since first 1D linear array 106 is horizontal in the example of FIG. 2), and therefore a conventional guard antenna (with relatively uniform antenna gain in all receive directions) can only disambiguate target returns from transmit sidelobes 304 (e.g., repeated in the horizontal dimension). That is, the conventional guard antenna cannot be used to blank receive sidelobes 354 of second 1D linear array 108 (e.g., returns caused by sidelobes in the vertical dimension) and therefore would not blank all clutter resulting from sidelobe products 404. The present embodiments solve this problem by using both (a) a receive guard operation to blank signals within the receive sidelobes, and (b) a transmit guard operation to blank signals resulting from the transmit sidelobes. The receive blanking signal and the transmit blanking signal are used in combination to suppress clutter resulting from both the transmit sidelobes and the receive sidelobes (e.g., sidelobe products 404), thereby improving an output of the OLTRA radar system 100.

To disambiguate target returns in the orthogonal dimension (e.g., horizontal axis 212), OLTRA radar system 100 uses a single transmit "guard" element (e.g., transmit guard antenna 124, FIG. 1) to illuminate a scene (e.g., a space being evaluated by OLTRA radar system 100) without sidelobes and uses the full receive linear array (e.g., second 1D linear array 108, FIG. 2, with sidelobes) to detect the return. In an alternative embodiment, OLTRA radar system 100 illuminates the scene without sidelobes by transmitting a "spoiled beam" using multiple elements of first 1D linear array 106 for increased effective isotropic radiated power (EIRP). Radar controller 150 controls second 1D linear array 108 to receive transmit guard signal 184 and receiver 140 sends first return guard signal 186 to signal processor 142 via transmission line 167.

Signal processor 142 (or receiver 140) determines a first guard signal strength 146 of first return guard signal 186, a second guard signal strength 147 of second return guard signal 188, and a main beam signal strength 148 of radar return signal 182. Blanker 144 compares (e.g., using a thresholding algorithm) main beam signal strength 148 to first guard signal strength 146 and main beam signal strength 148 to second guard signal strength 147. When blanker 144 determines that main beam signal strength 148 is either (a) not greater than first guard signal strength 146 or (b) not greater than second guard signal strength 147, blanker 144 blanks radar return signal 182. That is, a signal strength of radar return signal 182 is greater than first guard signal strength 146 and greater than second guard signal strength 147 when a reflection from a target in the scene is received through the main beam.

Figure 5A:
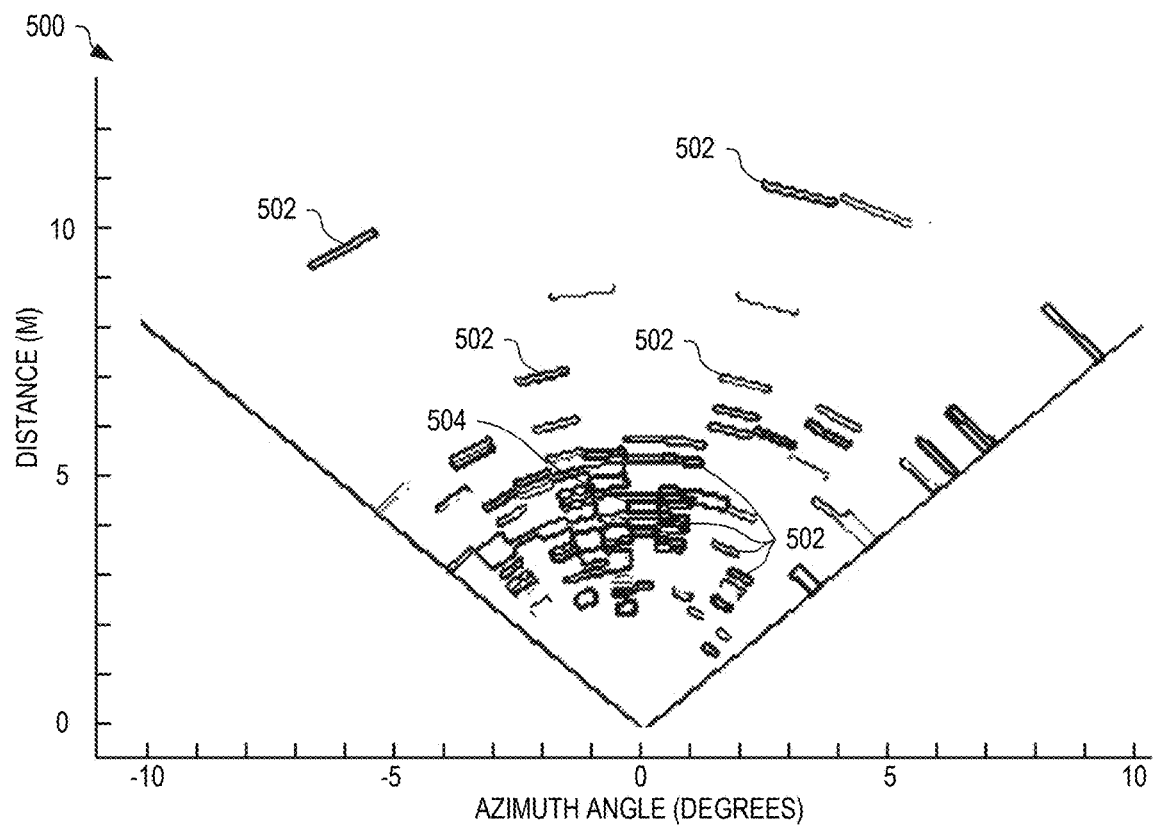
FIGS. 5A and 5B show example perceived targets resulting from processing of radar return signal without sidelobe blanking for a single corner reflector target positioned within a target space of the OLTRA radar system, in embodiments.
Figure 5B:
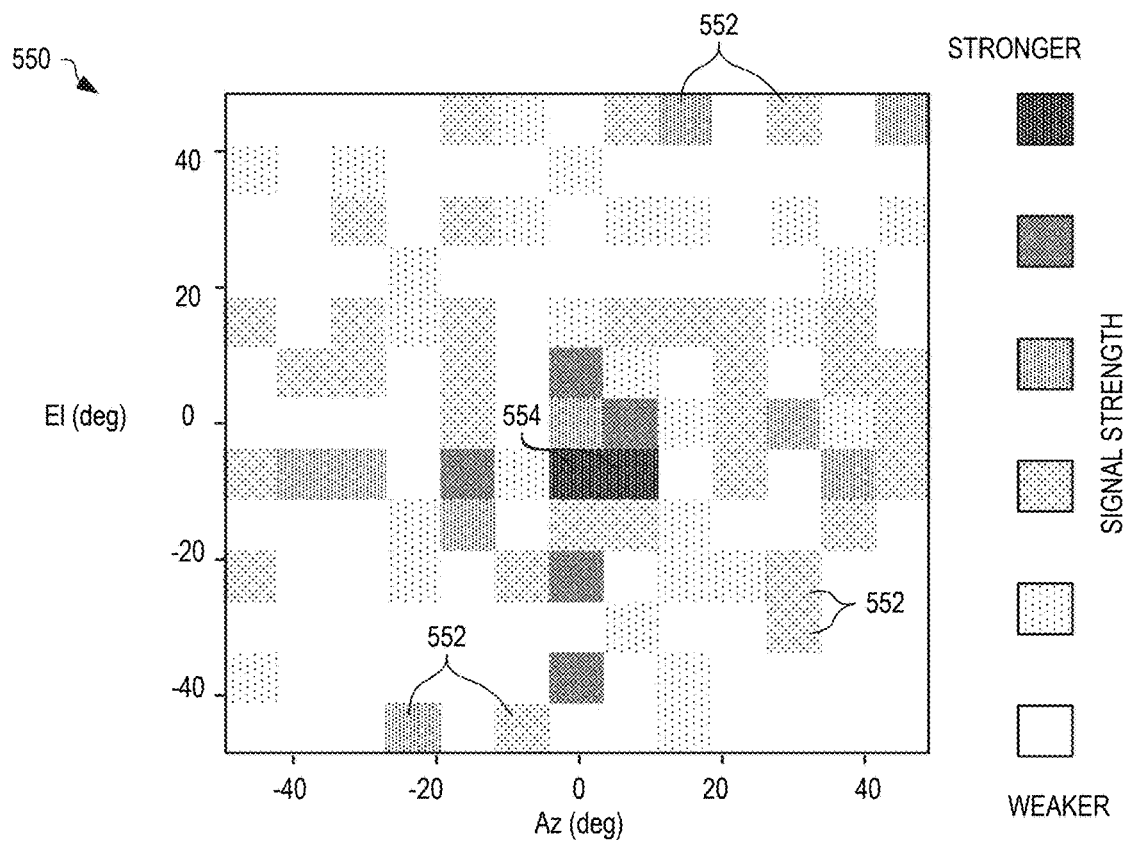

FIGS. 5A and 5B show example perceived targets resulting from processing of radar return signal 182 without sidelobe blanking for a single corner reflector target positioned within a target space of OLTRA radar system 100. FIG. 5A shows a 2D image graph 500 representing a plan view of perceived targets 502 (not all labelled for clarity of illustration) at 0° elevation over a distance of approximately ten meters from OLTRA antenna 104, which is located at position 0,0 on the graph. Accordingly, 2D image graph 500 represents a horizontal slice through the target space of OLTRA radar system 100 as perceived by OLTRA radar system 100 without sidelobe blanking. Target 504 of 2D image graph 500 represents the single corner reflector target (e.g., the actual target within the target space of OLTRA radar system 100), but is difficult to discern because of the clutter (false returns) in 2D image graph 500.

FIG. 5B is a range map plot 550 showing a 2D array of pixels for different azimuth and elevation angles relative to OLTRA antenna 104, where each pixel represents a strongest radar return signal 182 above a threshold for any distance without sidelobe blanking. Those skilled in the art may represent both range and signal strength above a threshold to provide a better representation of the scene.

Range map plot 550 indicates that radar return signal 182 includes many returns 552 (not all labelled for clarity of illustration) of varying intensity and direction and also includes stronger returns 554 at a corresponding location of the single corner reflector target within the target space of OLTRA radar system 100.

Clearly, as shown by 2D image graph 500 and range map plot 550, without sidelobe blanking, false returns are perceived as targets and reduce quality of output from OLTRA radar system 100.

Figure 6:
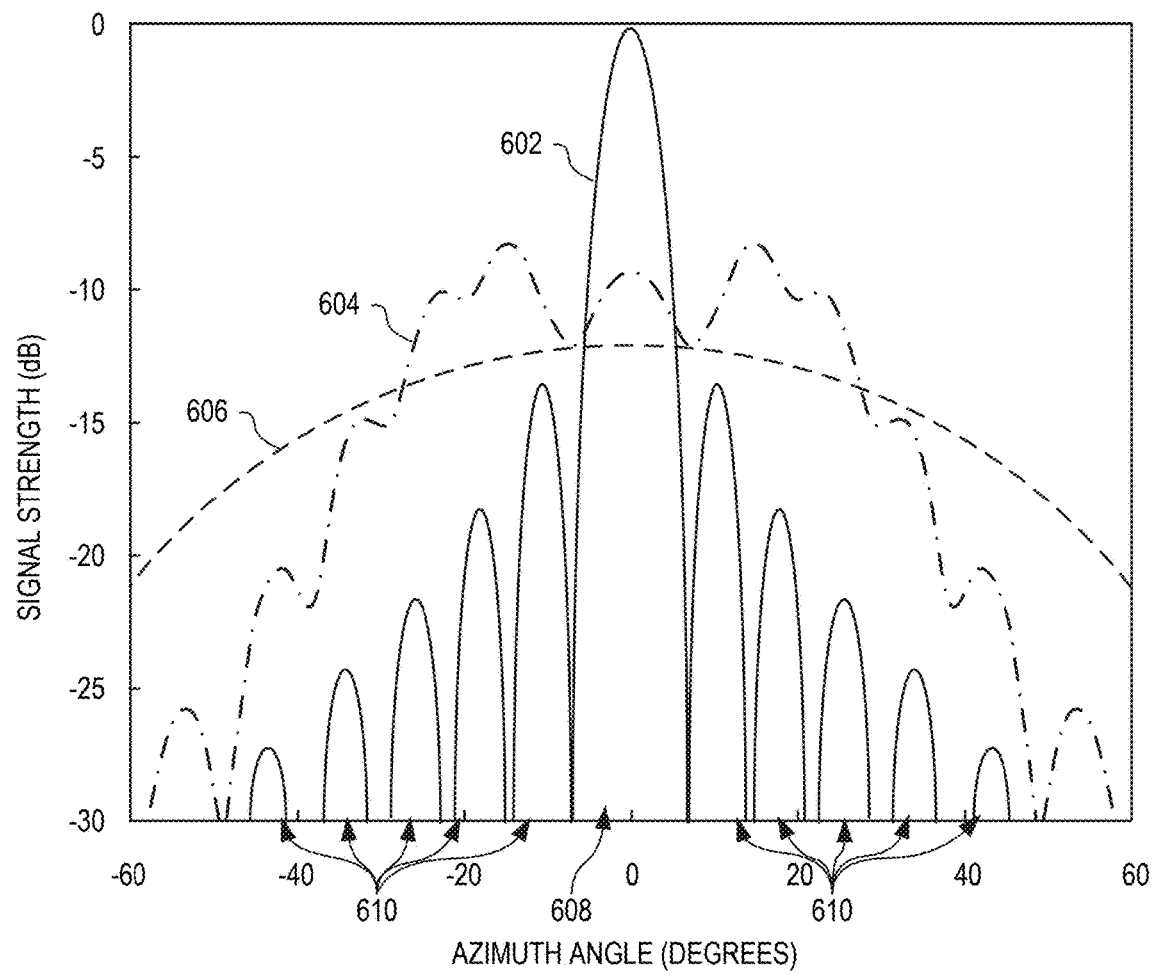
FIG. 6 is a graph illustrating one example fan beam that may represent the transmit main lobe and the receive main lobe of FIG. 2, a transmit guard signal, and a receive guard signal, in embodiments.

FIG. 6 is a graph 600 illustrating one example fan beam 602 that may represent transmit main lobe 206 and receive main lobe 208 of FIG. 2. Graph 600 shows the narrow beamwidth of fan beam 602 with a main lobe 608 (e.g., main transmit lobe 302 or main receive lobe 352), and a plurality of sidelobes 610 (e.g., transmit sidelobes 304 or receive sidelobes 354).

Graph 600 also shows a transmit guard beam 604 that in this example is generated as a spoiled beam using multiple elements of first 1D linear array 106. However, as shown in FIG. 1, transmit guard beam 604 may be generated by transmit guard antenna 124 (e.g., a single higher-powered element) that may be distinct from first 1D linear array 106. Graph 600 also shows a receive guard beam 606 that may represent a receive beam (e.g., receive gain profile characteristics) of receive guard antenna 174 of FIG. 1. Graph 600 indicates that strength of the transmit guard signal 604 and receive guard signal 606 are higher than sidelobes 610 of fan beam 602 and thereby may be used to differentiate between sidelobe signals and main beam signals.

Time Separated Operation

Figure 7:
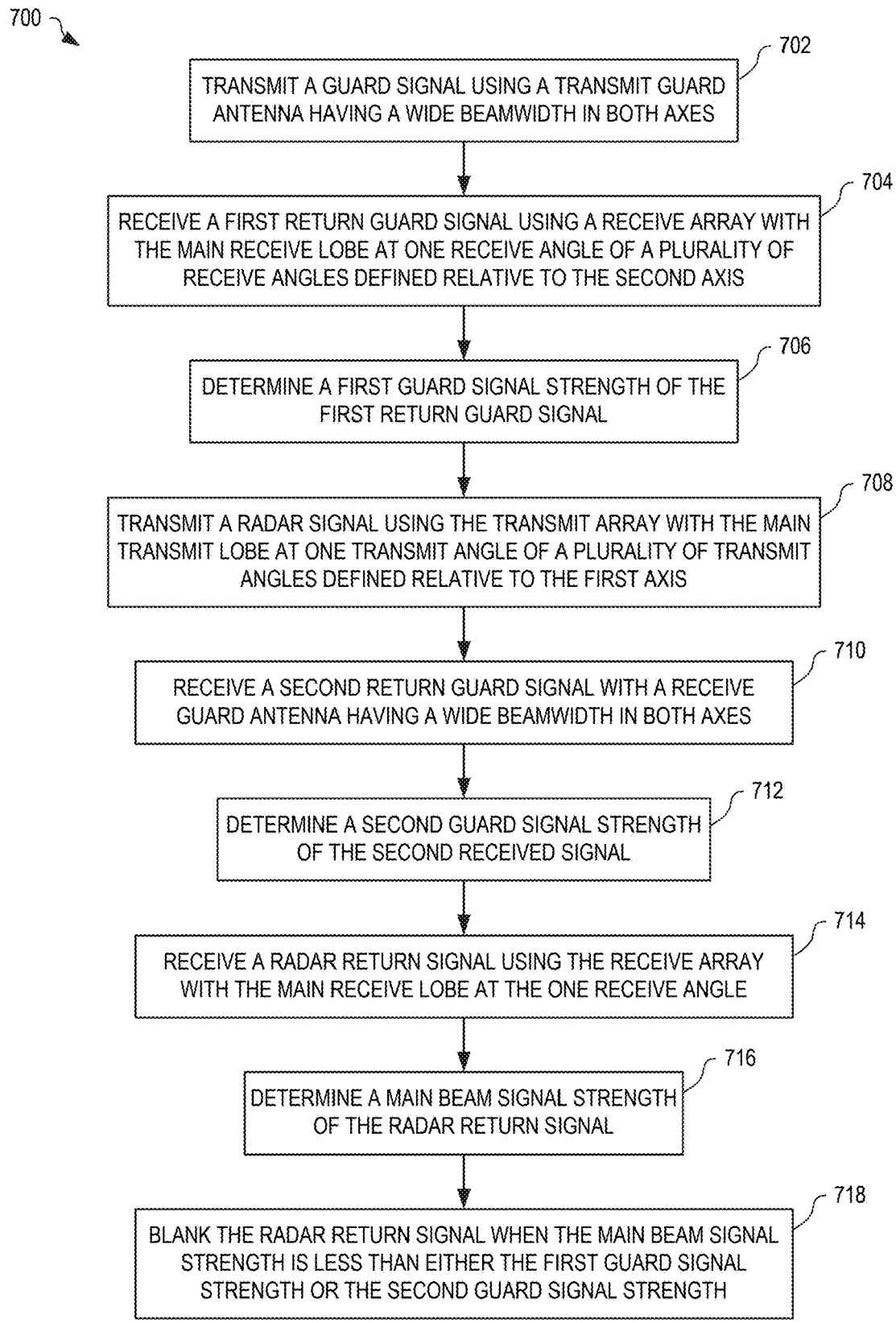
FIG. 7 is a flowchart illustrating one example method for OLTRA radar sidelobe blanking, in embodiments.

FIG. 7 is a flowchart illustrating one example method 700 for OLTRA radar sidelobe blanking. Method 700 is implemented in blanker 144 of FIG. 1, for example. In this embodiment, a plurality of transmit antenna elements (e.g., apertures 202) form a transmit array (e.g., first 1D linear array 106) that extends linearly along a first axis (e.g., horizontal axis 212), a plurality of receive antenna elements (e.g., apertures 204) form a receive array (e.g., second 1D linear array 108) that extends linearly along a second axis (e.g., vertical axis 214) perpendicular to the first axis, and radar signal 180 and transmit guard signal 184 may have similar signal characteristic and are time separated during operation.

In block 702, method 700 transmits, with a transmit guard antenna having a wide beamwidth in both axes, a transmit guard signal. In one example of block 702, radar controller 150 activates guard transmitter 120 to output transmit guard signal 184 from transmit guard antenna 124. In another example of block 702, radar controller 150 controls multiple elements of first 1D linear array 106 to transmit a spoiled beam, similar to transmit guard signal 604 of FIG. 6.

In block 704, method 700 receives a first return guard signal using the receive array with the main receive lobe at one receive angle of a plurality of receive angles defined relative to the second axis. In one example of block 704, radar controller 150 controls second 1D linear array 108 to steer receive main lobe 208 to one of the plurality of receive angles defined relative to vertical axis 214 and receives first return guard signal 186.

In block 706, method 700 determines a first guard signal strength of the first return guard signal. In one example of block 706, signal processor 142 determines first guard signal strength 146 of first return guard signal 186. In block 708, method 700 transmits a radar signal using the transmit array with the main transmit lobe at one of a plurality of transmit angles defined relative to the first axis. In one example of block 708, radar controller 150 controls first 1D linear array 106 to steer transmit main lobe 206 to one of the plurality of transmit angles defined relative to horizontal axis 212 and transmits radar signal 180.

In block 710, method 700 receives a second return guard signal with a receive guard antenna having a wide beamwidth in both axes. In one example of block 710, guard receiver 170 uses receive guard antenna 174 to receive second return guard signal 188. In block 712, method 700 determines a second guard signal strength of the second received signal. In one example of block 712, signal processor 142 determines second guard signal strength 147 of second return guard signal 188.

In block 714, method 700 receives a radar return signal using the receive array with the main receive lobe at the one receive angle. In one example of block 714, radar controller 150 controls second 1D array 108 to steer receive main lobe 208 to the same receive angle as used in block 704 and receives radar return signal 182. In block 716, method 700 determines a main beam signal strength of the radar return signal. In one example of block 716, signal processor 142 determines main beam signal strength 148 of radar return signal 182.

In block 718, method 700 blanks the radar return signal when the main beam signal strength is less than either the first guard signal strength or the second guard signal strength. In one example of block 718, blanker 144 blanks radar return signal 182 when main beam signal strength 148 is (a) less than first guard signal strength 146, or (b) less than second guard signal strength 147.

Overlap Operation

In this embodiment, radar signal 180 and transmit guard signal 184 are distinguishable from one another through differing signal characteristics (e.g., one or more of frequency, modulation, polarization, and encoding), and therefore need not be time separated during operation. That is, transmission of radar signal 180 and transmit guard signal 184 may occur concurrently (e.g., temporally overlapped).

Figure 8:
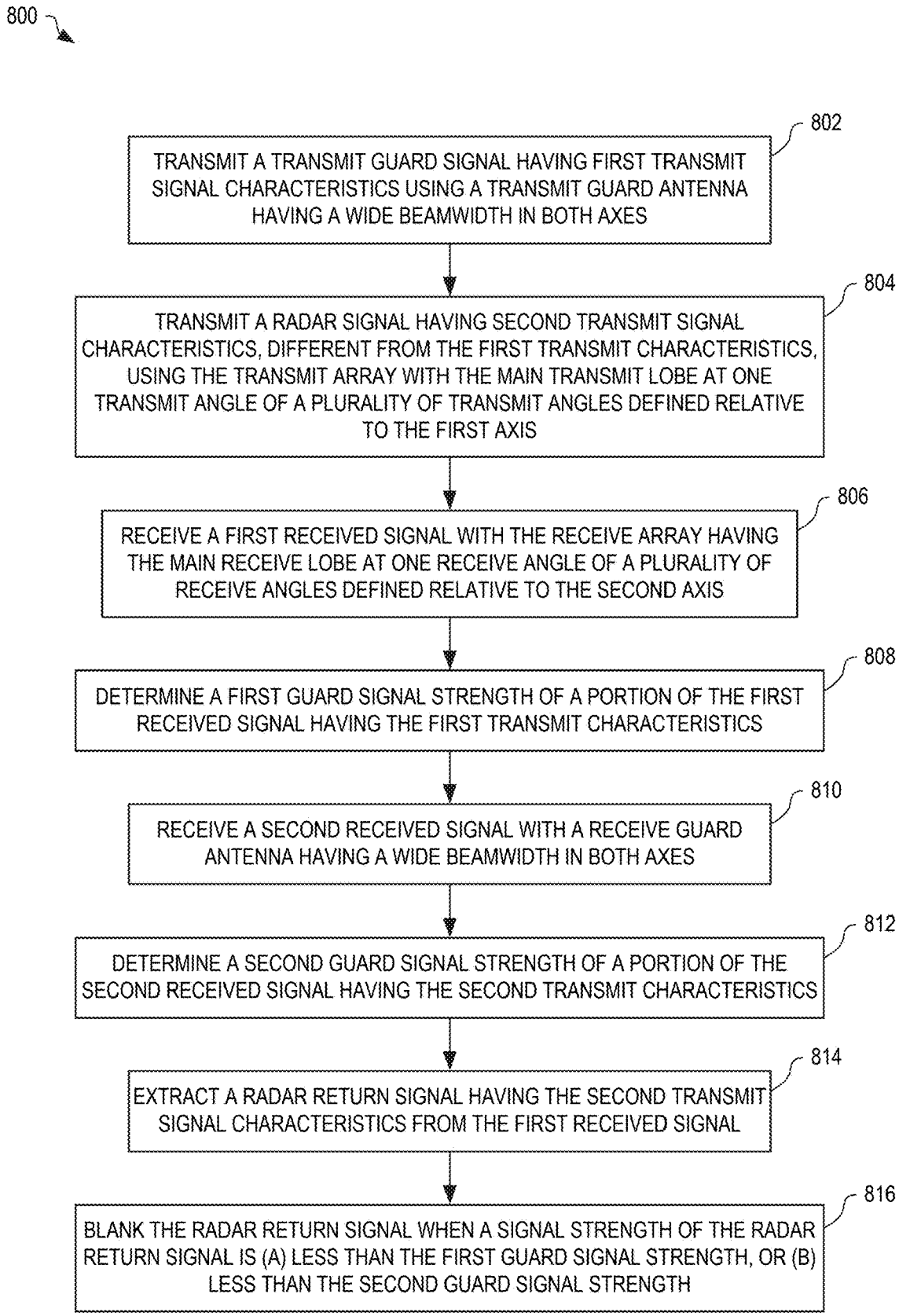
FIG. 8 is a flowchart illustrating one example method for OLTRA radar sidelobe blanking with overlapping transmit signals, in embodiments.

FIG. 8 is a flowchart illustrating one example method 800 for OLTRA radar sidelobe blanking with overlapping transmit signals. Method 800 is implemented in blanker 144 of FIG. 1, for example.

In block 802, method 800 transmits, with a transmit guard antenna having a wide beamwidth in both axes, a transmit guard signal having first transmit signal characteristics. In one example of block 802, radar controller 150 activates guard transmitter 120 to output transmit guard signal 184, characterized by first characteristics, from transmit guard antenna 124. In another example of block 702, in certain embodiments, radar controller 150 controls multiple elements of first 1D linear array 106 to transmit a spoiled beam, characterized by first characteristics, similar to transmit guard beam 604 of FIG. 6.

In block 804, method 800 transmits a radar signal having second transmit signal characteristics, different from the first transmit characteristics, using the transmit array with the main transmit lobe at one of a plurality of transmit angles defined relative to the first axis. In one example of block 804, radar controller 150 controls first 1D linear array 106 to steer transmit main lobe 206 to one of the plurality of transmit angles defined relative to horizontal axis 212 and transmits radar signal 180 that has second characteristics (e.g., one or more of frequency, modulation, polarization, and encoding) different from the first characteristics.

In block 806, method 800 receives a first received signal using the receive array having the main receive lobe at one receive angle of a plurality of receive angles defined relative to the second axis. In one example of block 806, radar controller 150 controls second 1D linear array 108 to steer receive main lobe 208 to a first of the plurality of receive angles defined relative to vertical axis 214 and captures radar return signal 182 and first return guard signal 186. In block 808, method 800 determines a first guard signal strength of a portion of the first received signal having the first transmit characteristics. In one example of block 808, signal processor 142 filters out radar return signal 182 and determines second guard signal strength 147 as a signal strength of first return guard signal 186.

In block 810, method 800 receives a second received signal using a receive guard antenna having a wide beamwidth in both axes. In one example of block 810, guard receiver 170 uses receive guard antenna 174 to receive second return guard signal 188, which in this embodiment may include reflections of the radar signal 180 from an object or target (including volumetric targets, like weather) and reflections of transmit guard signal 184 from and object or target. In block 812, method 800 determines a second guard signal strength of a portion of the second received signal having the second transmit characteristics. In one example of block 812, signal processor 142 filters out first return guard signal 186 (e.g., reflections of transmit guard signal 184 from any objects or targets) and determines first guard signal strength 146 as a signal strength of reflections of radar signal 180.

In block 814, method 800 extracts, from the second received signal, a radar return signal having the second transmit signal characteristics. In one example of block 814, signal processor 142 filters out first return guard signal 186 (e.g., reflections of transmit guard signal 184 from any objects or targets) to determine radar return signal 182.

In block 816, method 800 blanks the radar return signal when a signal strength of the radar return signal is (a) less than the first guard signal strength, or (b) less than the second guard signal strength. In one example of block 816, blanker 144 blanks radar return signal 182 when main beam signal strength 148 is (a) less than first guard signal strength 146, or (b) less than second guard signal strength 147.

Figure 9A:
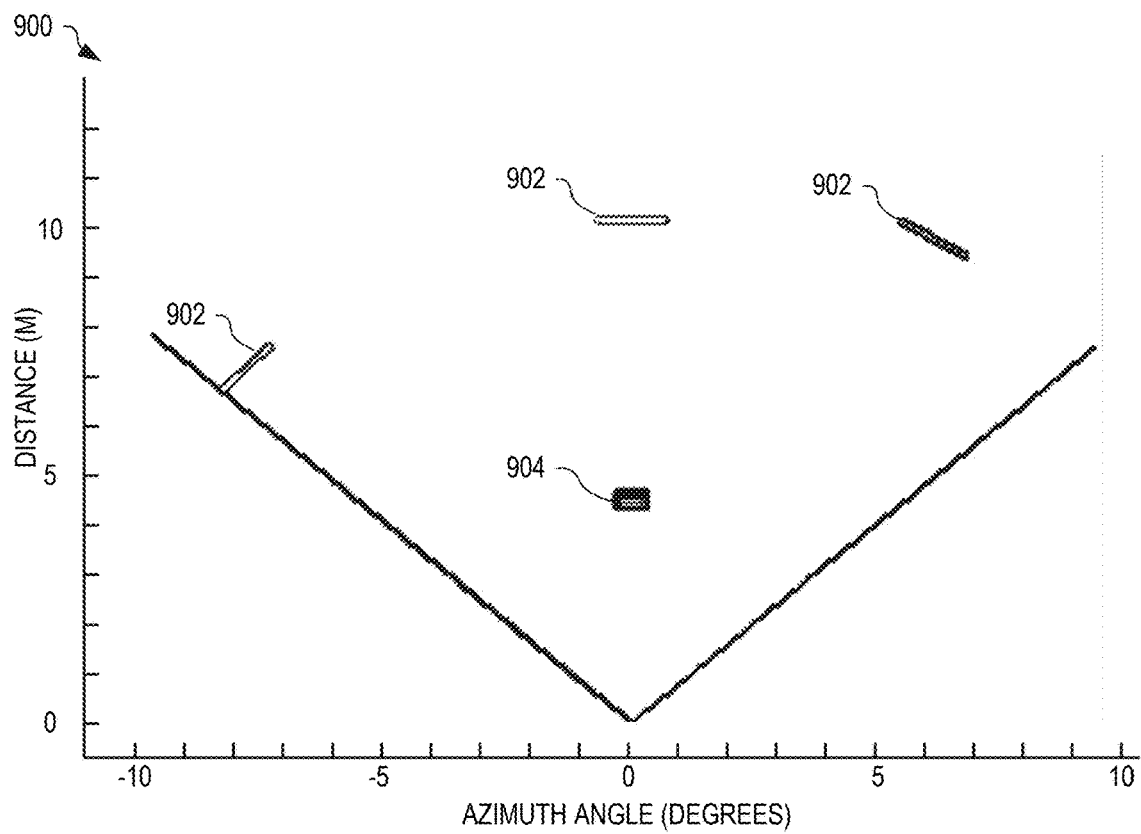
FIGS. 9A and 9B show example perceived targets resulting from processing of the radar return signal with sidelobe blanking for a single corner reflector target positioned within the target space of the OLTRA radar system, in embodiments.
Figure 9B:
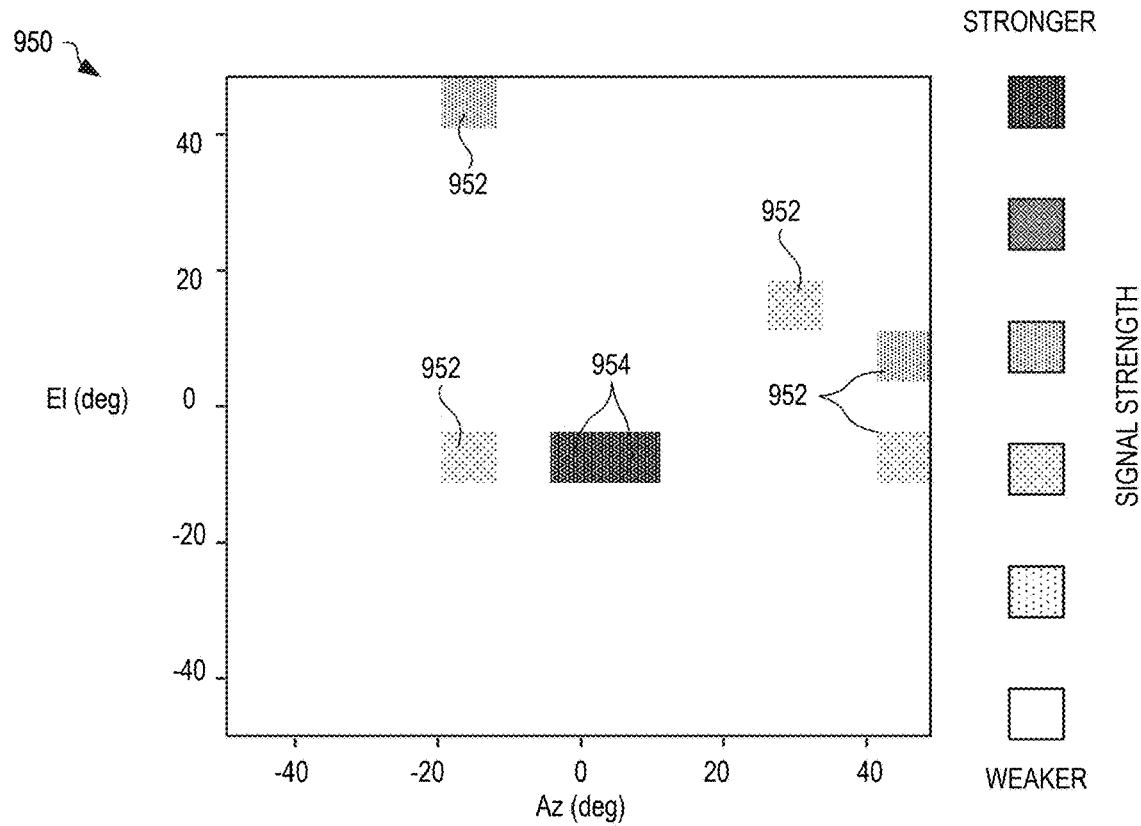

FIGS. 9A and 9B show example perceived targets resulting from processing of radar return signal 182 with sidelobe blanking including a single corner reflector target positioned within the target space of OLTRA radar system 100. FIG. 9A shows an example 2D image graph 900 resulting from processing of radar return signal 182 with sidelobe blanking. 2D image graph 900 is a plan view showing a few perceived targets 902 at 0° elevation over a distance of approximately ten meters from OLTRA antenna 104, which is located at the origin on the graph. Thus, 2D image graph 900 represents a horizontal slice through the target space of OLTRA radar system 100 as perceived by OLTRA radar system 100 when using sidelobe blanking. Target 904 of 2D image graph 900 represents the single corner reflector target.

FIG. 9B is one example range map plot 950 resulting from processing of radar return signal 182 with sidelobe blanking. Range map plot 950 is a 2D grid of pixels at different azimuth and elevation angles, of the strongest radar return signal 182 for any distance. Those skilled in the art may represent both range and signal strength above a threshold to provide a better representation of the scene. Range map plot 950 shows a few pixels 952 that indicate perceived targets, and pixels 954 represent the single corner reflector target. Clearly, with sidelobe blanking as shown by 2D image graph 900 and range map plot 950, as compared to 2D image graph 500 and range map plot 550 of FIGS. 5A and 5B, the number of false returns perceived as targets is significantly reduced by sidelobe blanking thereby improving the quality of output from OLTRA radar system 100.

FIG. 10 is a schematic diagram illustrating an example computing apparatus 1000 that implements signal processor 142 of FIG. 1, in embodiments. Computing apparatus 1000 includes a system bus 1001 that interconnects a digital processor 1004 with an input interface 1002, an output interface 1006, and memory 1008 (e.g., one or more of RAM, ROM, SRAM, DRAM, FLASH, etc.). Memory 1008 includes machine-readable instructions 1010 (e.g., software) that are executable by digital processor 1004 and data 1012. In this embodiment, blanker 144 is implemented within machine-readable instructions 1010; however, in other embodiments blanker 144 may be implemented as a combination of hardware and software. Data 1012 includes a digital representation of radar return signal 182, first return guard signal 186, second return guard signal 188, first guard signal strength 146, second guard signal strength 147, and main beam signal strength 148.

Although computing apparatus 1000 is shown with one system bus 1001, computing apparatus 1000 may be implemented with a different type of architecture without departing from the scope hereof. For example, the machine-readable instructions 1010 and data 1012 may be stored in separate memories that communicate with digital processor 1004 using separate buses. In this case, the machine-readable instructions 1010 and data 1012 may be stored in separate memory spaces, thereby implementing a Harvard architecture. Alternatively, digital processor 1004 may include one or more layers of cache so that the computing apparatus 1000 implements a modified Harvard architecture using only system bus 1001. In some embodiments, the machine-readable instructions 1010 are stored as an application in secondary storage (e.g., a hard drive), and loaded into memory 1008 upon powering on (i.e., boot up). In this case, machine-readable instructions 1010 and data 1012 share the same memory space, thereby implementing a von Neumann architecture.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A sidelobe blanking method for a radar system, the radar system having:
    a plurality of transmit antenna elements forming a transmit array that extends linearly along a first axis;
    a plurality of receive antenna elements forming a receive array that extends linearly along a second axis perpendicular to the first axis;
    the transmit array having a first radiation pattern with a main transmit lobe narrow along the first axis and wide along the second axis; and
    the receive array having a second radiation pattern with a main receive lobe wide in the first axis and narrow in the second axis;
    the sidelobe blanking method comprising:
        transmitting a guard signal from a transmit guard antenna having a wide beamwidth in both the first and second axes;
        controlling the receive array to sweep the main receive lobe through a plurality of receive angles defined relative to the second axis, wherein for each receive angle of the plurality of receive angles, the sidelobe blanking method includes:
            receiving a first received signal using the receive array; and
            determining a first guard signal strength of the first received signal for said each receive angle; and
        rastering the radar system by (i) controlling the transmit array to sweep the main transmit lobe through a plurality of transmit angles defined relative to the first axis and (ii) controlling the receive array to sweep the main receive lobe through the plurality of receive angles, wherein for each transmit angle of the plurality of transmit angles and each receive angle of the plurality of receive angles, the sidelobe blanking method includes:
            transmitting, with the transmit array, a radar signal;
            receiving, after said transmitting the radar signal, a second received signal with a receive guard antenna having a wide beamwidth in both the first and second axes;
            determining a second guard signal strength of the second received signal;
            receiving, after said transmitting the radar signal, a third received signal with the receive array;
            determining a main beam signal strength of the third received signal; and
            blanking the radar signal when the main beam signal strength is less than either the first guard signal strength for said each receive angle or the second guard signal strength.

2. A sidelobe blanking method for a radar system, the radar system having:
    a plurality of transmit antenna elements forming a transmit array that extends linearly along a first axis;
    a plurality of receive antenna elements forming a receive array that extends linearly along a second axis perpendicular to the first axis;
    the transmit array having a radiation pattern with a main transmit lobe narrow along the first axis and wide along the second axis; and
    the receive array having a radiation pattern with a main receive lobe wide in the first axis and narrow in the second axis; and
    the sidelobe blanking method comprising:
        transmitting, with a transmit guard antenna having a wide beamwidth in both the first and second axes, a transmit guard signal;
        receiving a first return guard signal using the receive array with the main receive lobe at one receive angle of a plurality of receive angles defined relative to the second axis;
        determining a first guard signal strength of the first return guard signal;
        transmitting a radar signal using the transmit array with the main transmit lobe at one of a plurality of transmit angles defined relative to the first axis;
        receiving, after said transmitting the radar signal, a second return guard signal with a receive guard antenna having a wide beamwidth in both axes;
        determining a second guard signal strength of the second return guard signal;

receiving, after said transmitting the radar signal, a radar return signal using the receive array with the main receive lobe at the one receive angle;

determining a main beam signal strength of the radar return signal; and blanking the radar return signal when the main beam signal strength is less than either the first guard signal strength or the second guard signal strength.

3. The sidelobe blanking method of claim 2, further comprising rastering the radar system by:

controlling the transmit array to sweep the main transmit lobe through a plurality of transmit angles defined relative to the first axis; and controlling the receive array to sweep the main receive lobe through the plurality of receive angles.

4. The sidelobe blanking method of claim 2, the radar system being a frequency-modulated continuous-wave radar system.

5. The sidelobe blanking method of claim 2, the transmit guard antenna being one of the plurality of transmit antenna elements.

6. The sidelobe blanking method of claim 2, the transmit guard antenna being at least two of the plurality of transmit antenna elements, the sidelobe blanking method further comprising transmitting the transmit guard signal as a spoiled beam.

7. The sidelobe blanking method of claim 2, the transmit guard antenna being distinct from the transmit array.

8. The sidelobe blanking method of claim 2, the receive guard antenna being one of the plurality of receive antenna elements.

9. The sidelobe blanking method of claim 2, the receive guard antenna being distinct from the receive array.

10. A sidelobe blanking method for a radar system having a plurality of transmit antenna elements forming a transmit array that extends linearly along a first axis and a plurality of receive antenna elements forming a receive array that extends linearly along a second axis perpendicular to the first axis, the transmit array having a radiation pattern with a main transmit lobe narrow along the first axis and wide along the second axis, the receive array having a radiation pattern with a main receive lobe wide along the first axis and narrow along the second axis, the sidelobe blanking method comprising:

transmitting, with a transmit guard antenna having a wide beamwidth in both axes, a transmit guard signal having first transmit signal characteristics;

transmitting a radar signal having second transmit signal characteristics, different from the first transmit signal characteristics, using the transmit array with the main transmit lobe at one of a plurality of transmit angles defined relative to the first axis;

receiving a first received signal with the receive array having the main receive lobe at one receive angle of a plurality of receive angles defined relative to the second axis;

determining a first guard signal strength of a portion of the first received signal having the first transmit signal characteristics;

receiving a second received signal with a receive guard antenna having a wide beamwidth in both axes;

determining a second guard signal strength of a portion of the second received signal having the second transmit signal characteristics;

extracting, from the first received signal, a radar return signal having the second transmit signal characteristics; and blanking the radar return signal when a signal strength of the radar return signal is either (a) less than the first guard signal strength, or (b) less than the second guard signal strength.

11. The sidelobe blanking method of claim 10, further comprising rastering the radar system by:

controlling the transmit array to sweep the main transmit lobe through a plurality of transmit angles defined relative to the first axis; and controlling the receive array to sweep the main receive lobe through the plurality of receive angles.

12. The sidelobe blanking method of claim 10, the radar system being a frequency-modulated continuous-wave radar.

13. The sidelobe blanking method of claim 10, the transmit guard antenna being one of the plurality of transmit antenna elements.

14. The sidelobe blanking method of claim 10, the transmit guard antenna being multiple transmit antenna elements of the plurality of transmit antenna elements, the method further comprising transmitting the transmit guard signal as a spoiled beam from the multiple transmit antenna elements.

15. The sidelobe blanking method of claim 10, the transmit guard antenna being distinct from the transmit array.

16. The sidelobe blanking method of claim 10, the receive guard antenna being one of the plurality of receive antenna elements.

17. The sidelobe blanking method of claim 10, the receive guard antenna being distinct from the receive array.

18. The sidelobe blanking method of claim 10, the second received signal including a reflection of the transmit guard signal and a reflection of the radar signal.

19. The sidelobe blanking method of claim 10, the first transmit signal characteristics and the second transmit signal characteristics differing in one or more of frequency, modulation, polarization, and encoding.

* * * * *